(12) United States Patent
Karambelas et al.

(10) Patent No.: US 6,460,671 B1
(45) Date of Patent: Oct. 8, 2002

(54) VEHICLE DRIVE CLUTCH CONTROL

(75) Inventors: Randy C. Karambelas, Milwaukie; Bryan M. Averill, Portland; Oliver Heravi, Tigard; Peter A. Lines, Portland, all of OR (US)

(73) Assignee: Warn Industries, Inc., Clackamas, OR (US)

( * ) Notice: Subject to any disclaimer, the term of this patent is extended or adjusted under 35 U.S.C. 154(b) by 0 days.

(21) Appl. No.: 09/727,829

(22) Filed: Nov. 30, 2000

(51) Int. Cl.⁷ .......................... B60K 23/08; F16D 27/00
(52) U.S. Cl. ........................ 192/36; 180/247; 192/36; 192/40; 192/43.1; 192/44; 192/84.2; 192/84.6
(58) Field of Search .............................. 192/35, 36, 38, 192/39, 40, 43.1, 44, 46, 47, 84.2, 84.96, 84.6; 180/247

(56) References Cited

U.S. PATENT DOCUMENTS

| | | | | |
|---|---|---|---|---|
| 4,098,379 A | * | 7/1978 | Fogelberg et al. | 192/38 |
| 5,195,604 A | | 3/1993 | Brockett | |
| 5,605,201 A | * | 2/1997 | McGinn et al. | 180/197 |
| 5,704,444 A | * | 1/1998 | Showalter | 180/247 |
| 5,704,867 A | * | 1/1998 | Bowen | 475/205 |
| 5,782,328 A | * | 7/1998 | Fogelberg et al. | 192/35 |
| 5,927,455 A | | 7/1999 | Baker | |
| 5,967,277 A | | 10/1999 | Walter | |
| 5,971,123 A | * | 10/1999 | Ochab et al. | 192/38 |
| 5,992,592 A | * | 11/1999 | Showalter | 192/43.1 |
| 6,019,185 A | | 2/2000 | Itoh | |
| 6,132,332 A | | 10/2000 | Yasui | |

* cited by examiner

*Primary Examiner*—Rodney H. Bonck
(74) *Attorney, Agent, or Firm*—Robert L. Harrington; Schwabe, Williamson & Wyatt, P.C.

(57) ABSTRACT

A clutch control for shifting a vehicle drive system as between automatic four-wheel drive, locked four-wheel drive and two-wheel drive. An engagement system for engaging drive and driven components of the drive system may include roller clutch engagement or pawl clutch engagement. The clutch system is provided with a coupling mechanism for coupling the engagement member to ground or to the driven member to thereby achieve automatic four-wheel drive and locked four-wheel drive, respectively. The engagement member is decoupled from both ground and the driven member to achieve two-wheel drive.

13 Claims, 7 Drawing Sheets

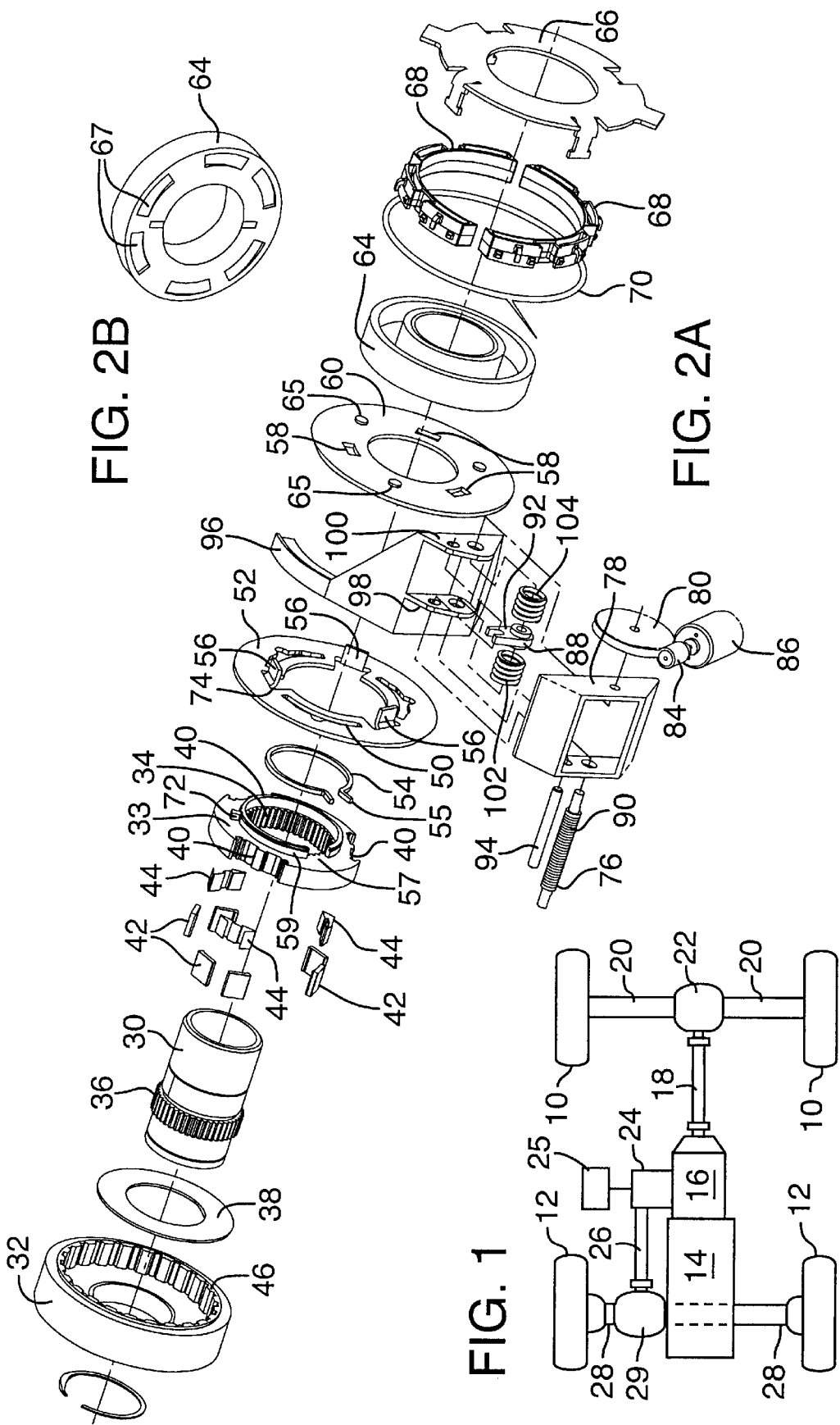

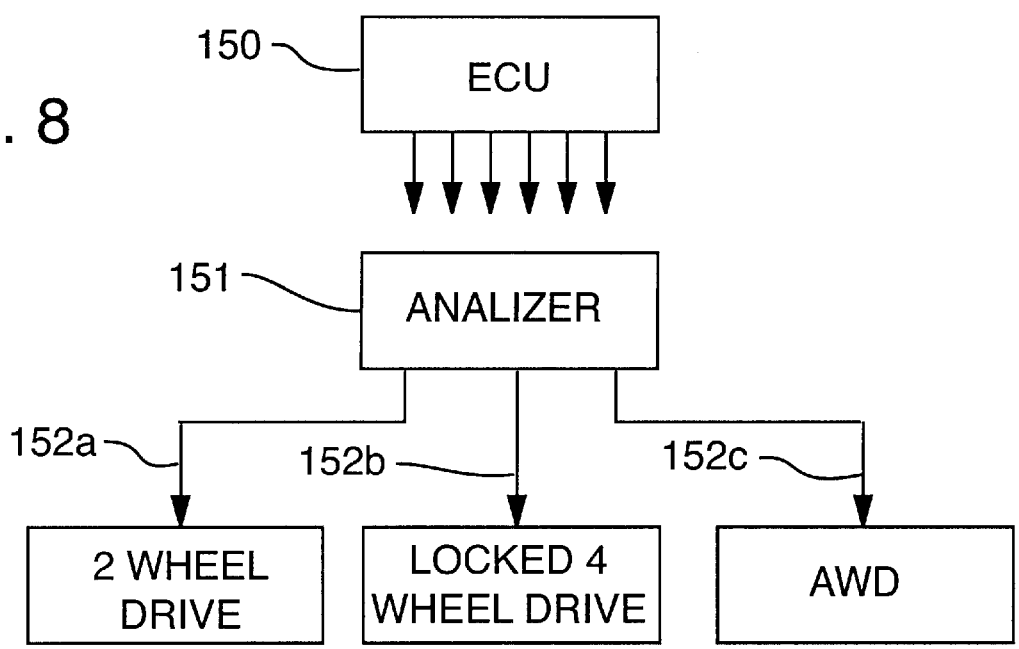

and the front wheels are provided with selective drive. The front wheels may be provided with a type of front wheel drive referred to as automatic four-wheel drive where the front wheels are driven only when the rear wheels overdrive the front wheels. They may instead or additionally be provided with a locked four-wheel drive where the rear wheels and front wheels are driven together under all conditions.

VEHICLE DRIVE CLUTCH CONTROL

FIELD OF THE INVENTION

This invention relates to vehicles that can be converted between four-wheel and two-wheel drive and more particularly to the manner of controlling the different modes of engagement.

BACKGROUND OF THE INVENTION

It is common to provide vehicles with the capability to transfer or convert between four-wheel and two-wheel drive. A vehicle is typically provided with permanent rear wheel drive and the front wheels are provided with selective drive. The front wheels may be provided with a type of front wheel drive referred to as automatic four-wheel drive where the front wheels are driven only when the rear wheels overdrive the front wheels. They may instead or additionally be provided with a locked four-wheel drive where the rear wheels and front wheels are driven together under all conditions.

There are benefits and advantages of each mode of operation (two-wheel drive, automatic four-wheel drive and locked four-wheel drive). Two-wheel drive mode is the most efficient. The drive mechanism (propellor shaft, differential gears and axles) for the front wheels are rendered inactive and that drive mechanism does not consume power and does not wear when idle. Automatic four-wheel drive mode is the easiest for the driver. The driver does not have to forecast when four-wheel drive may be needed, it is not operational when it is not needed and it engages when needed. Locked four-wheel drive may be considered the safest and most reliable. It provides for engine braking of the front wheels and it always produces driving of all four wheels whether going forward or backward.

Numerous situations could be described wherein the driving conditions favor one form of drive mode over the others. The present invention is directed to a control feature that provides selection as between the different modes of drive. The control may be designed for manual selection and/or it may be designed for automatic selection of the desired drive mode (referred to sometimes as smart control).

BRIEF DESCRIPTION OF THE INVENTION

Switching between two-wheel drive and automatic four-wheel drive is known and two systems for accomplishing this conversion are referred to as the pawl clutch system (see U.S. Pat. Nos. 5,927,455 and 5,967,277) and the roller clutch system (see U.S. Pat. No. 5,195,604). In both of these clutch systems a clutch mechanism is positioned between a drive and driven member and controlled by a control member. The control members have limited rotation relative to the drive member. The control members are frictionally engaged with "ground" and are accordingly urged to a trailing position as permitted by said limited relative rotation. In the trailing position, the clutch mechanism interengages drive and driven members when the drive member attempts to overrun the driven member and does not produce inter-engagement of the drive and driven members when the driven member overruns the drive member. This is the automatic four-wheel drive mode of driving and functions the same whether driving forward or reverse. That is, upon reverse driving the trailing position of the control member is at the opposite end of the permitted relative rotation as between the control member and drive member and the clutch mechanism reverses in operation.

The present invention recognizes that if the control members become frictionally engaged to the driven member instead of to ground, the control member will still be urged to the trailing position of relative rotation when the drive member tries to overdrive the driven member (the same as in automatic four-wheel drive mode). However, the control member will also be urged to the opposite or leading position of relative rotation (as between the drive member and control member) if the driven member tries to overrun the drive member. The latter position is the same position as if the vehicle were driven in reverse and produces inter-engagement of the drive and driven members. Thus, the drive and driven members are locked together regardless of which member attempts to overrun the other which is the locked four-wheel drive mode.

It is also a characteristic of both the pawl clutch system and the roller clutch system that when the control member is substantially centered between the rearward most position and forward most position of permitted relative rotation with the drive member, the clutch mechanism provides no inter-engagement as between the drive and driven members. (There is an alternate arrangement of the pawl clutch system but the present invention utilizes that arrangement wherein the pawls are disengaged in the centered position.)

The present invention provides the capability of shifting the control member between positions of frictional engagement with ground, frictional engagement with the driven member and no frictional engagement. A centering mechanism urges centering of the control member between the rearward and forward most positions of relative rotation and when there is no frictional urging of the control member, the drive and driven members are free to rotate independently, which is the two-wheel drive mode.

Three different embodiments are disclosed herein for shifting the control member between the different modes of operation. The preferred embodiment utilizes a motor-driven lead screw that shifts a fork. The fork engages the control member and shifts the control member between a position of engagement with the driven member, engagement with ground and an intermediate position of non-engagement with either.

A second embodiment of the invention uses two electromagnets. An armature is in frictional engagement with the control member. The first electromagnet generates attraction of the armature and thus the control member to the driven member (locked four-wheel drive). The second electromagnet generates attraction of the armature to ground (automatic four-wheel drive). With both electromagnets deactivated, the armature rotates freely and the control member is urged by a centering spring to its center position (two-wheel drive).

A third embodiment uses a two-stage electromagnet and a return spring acting against an axially movable armature. The armature is rotatively coupled to the control member and the return spring urges the control member into frictional engagement with the driven member (locked four-wheel drive). Activation of the electromagnet generates a magnetic force that opposes the spring and draws the armature away from the driven member. The spring and electromagnet are cooperatively designed to provide one force level sufficient to draw the armature into frictional engagement with the coil which is grounded (automatic four-wheel drive). An intermediate magnetic force level draws the armature away from the control member which releases the frictional engagement with the driven member but not into frictional engagement with the coil. The centering mechanism then centers the control member for two-wheel drive.

Whereas the above refers to three different embodiments, it will be appreciated that each embodiment is applicable to either of the roller clutch system or the pawl clutch system. Furthermore, 46 additional systems may be devised and the invention may be incorporated into further embodiments of the invention as will be more fully appreciated upon reference to the following detailed description having reference to the accompanying drawings.

DESCRIPTION OF THE DRAWINGS

FIG. 1 is a schematic illustration in plan view of a vehicle chassis as contemplated for the present invention;

FIGS. 2 (including 2A and 2B) and 3 are an exploded isometric view and a sectional assembled view respectively of a first embodiment of the invention;

FIG. 8 illustrates the automatic control for the mechanisms of all of the embodiments.

DETAILED DESCRIPTION OF THE PREFERRED EMBODIMENT

Figure 3:
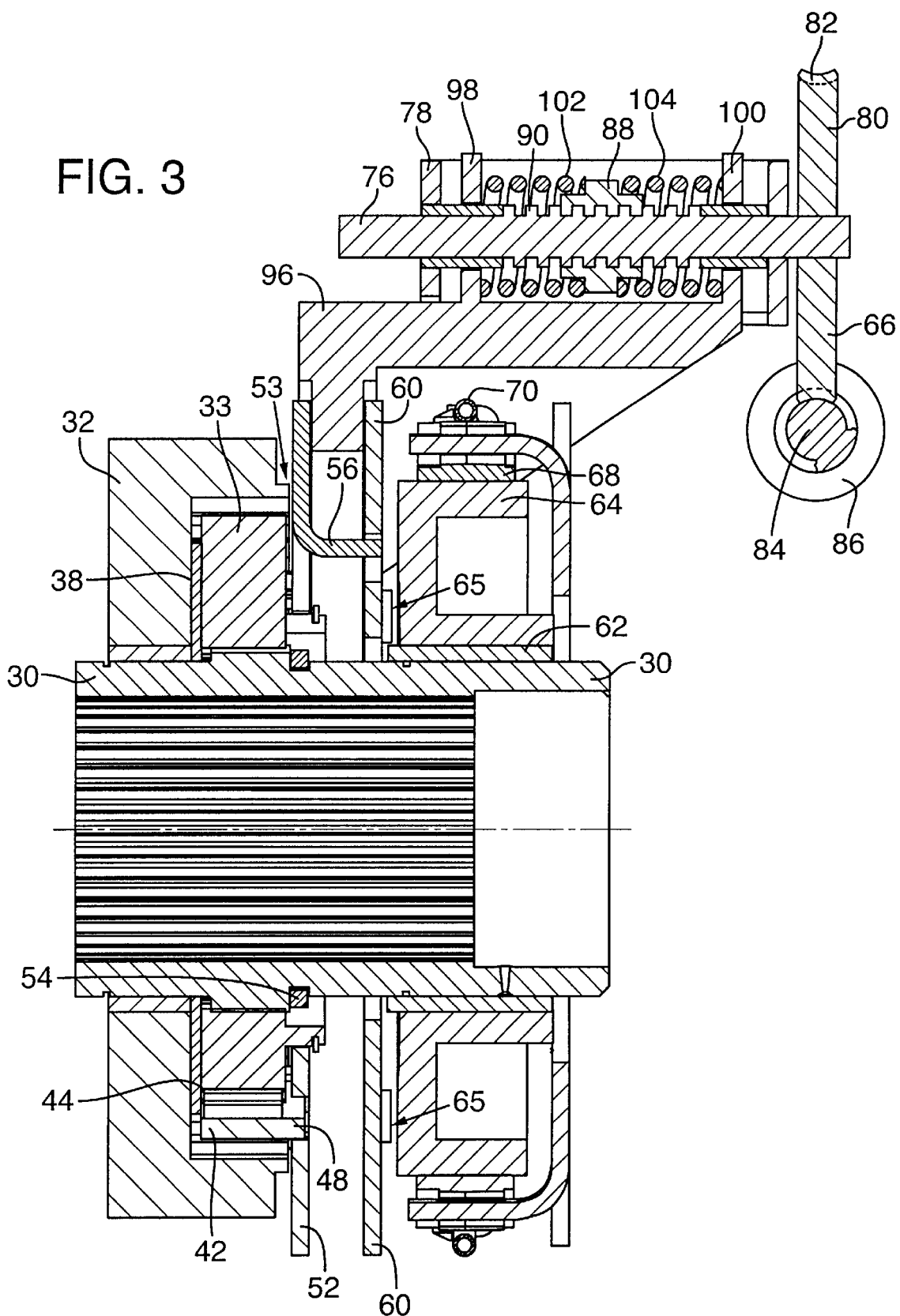

FIG. 1 illustrates schematically the components of a vehicle chassis to which the invention applies. The vehicle as shown includes rear wheels 10 and front wheels 12. An engine 14 is coupled to a transmission 16 which rotatably drives a propellor shaft 18. The propellor shaft 18 is coupled to a rear differential 22 from which rear axles 20 are driven for driving rear wheels 10.

The transmission 16 is coupled to a transfer case 24 for selectively driving front propellor shaft 26 (as controlled by shift mechanism 25). Shaft 26 is coupled to the front differential 29 for driving front axles 28 and front wheels 12. The clutch mechanism, as will now be described, may be incorporated into various positions in the drive train, but for purposes of this description it will be assumed to be incorporated into the transfer case 24 with the output to the front propellor shaft 26 being the driven member. Input is provided to the drive member from transmission 16.

FIGS. 2 (2A and 2B) and 3 illustrate a first and preferred embodiment of the invention. From the drawings item 30 is the drive member and item 32 is the driven member. Collar 33 is secured to the drive member 30 via matching splines 34 on collar 33 with splines 36 on the drive member 30. Upon assembly as seen in FIG. 3, a bearing washer 38 accommodates relative rotation as between the driven member 32 and the collar 33/drive member 30.

As shown in FIG. 2, three formed seats 40 are provided in the periphery of the collar 33 for receiving pawls 42 and biasing springs 44. The springs urge the pawls to project radially outwardly into formed shoulders 46 provided in the driven member 32. The pawls 42 have an axial projecting portion 48 (see FIG. 3) that projects into cam slots 50 of control plate 52. Rotation of the control plate 52 relative to the collar 33/drive member 30 allows selected pawls 42 to project into the shoulders 46 for engagement between the drive member and driven member. (See U.S. Pat. Nos. 5,927,455 and 5,967,277 for further detail and explanation about this pawl clutch operation.)

A centering spring 54 is rotatively fixed relative to the drive member 30/collar 33 through engagement of nibs 55 of the spring 54 with the walls of gap 57 in rim 59 of collar 33. The nibs 55 of spring 54 project into the relief 74 (established by the forming of tabs 56) of control plate 52 and thereby urge the control plate 52 to a centered position whereat the formed seats 40 and thus the pawls 42 are centered relative to slots 50 in the control plate 52. (A similar centering spring is disclosed in FIGS. 18, 18A and 18B of the '455 patent.) The three tabs 56 of '46 control plate 52 project into slots 58 of disk 60 so that the control plate 52 and disk 60 are rotatively fixed together.

A brake drum 64 is rotatively mounted on drive member 30 (via bearing 62 seen in FIG. 3). Adjacent to the disk 60, a rotatively fixed cage 66 carries brake pads 68 and a garter spring 70 urges the brake pads against the brake drum 64 to urge non-rotation of the drum 64.

From FIG. 3, it will be appreciated that movement of control plate 52 axially into frictional engagement with driven member 32 (at area 53) will urge the control plate 52 to follow the driven member. As the driven member shifts to a position of overrunning drive member 30/33, and then shifts to a position of being overrun by drive member 30/33, the control plate 52 similarly shifts first to one end of the limited relative rotation permitted between the control plate and drive member and then to the other end of such limited rotation. (The limited relative rotation is controlled by stop 72 on collar 33 being projected into the relief 74 provided by the formation of tab 56.) Because first one set and then the other of the pawls 42 are thereby engaged with corresponding shoulder formations 46, the drive and driven components are locked together in either direction of relative rotation, i.e., the locked four-wheel drive mode.

Now consider that the control plate 52 is axially released from frictional engagement with the driven member 32 and the disk 60 is shifted into engagement with drum 64. Such engagement is provided by the circular features 65 on disk 60 being projected into slots 67 of drum 64 (see FIG. 2B). Drum 64 is frictionally engaged to ground which urges retarded rotation of disk 60. Disk 60 is rotatively locked to control plate 52 (via tabs 56) and thus the control plate is rotatively retarded. The control plate maintains a rearward most position and therefore only permits pawl engagement when the drive member attempts to overrun the driven member. This is automatic four-wheel drive.

By shifting both the control plate 52 and the disk 60 to a mid-position, i.e., non-engagement with either the driven member or drum 64, the centering spring 54 centers the control plate and the drive and driven members are free to rotate independent of one another. (The two-wheel drive mode.)

The actuating mechanism for producing the shifting of the control plate and disk 60 is also shown in FIGS. 2 and 3. A lead screw 76 is rotatively mounted in cage 78. One end of screw 76 is attached to a worm wheel 80 having peripheral teeth 82. A worm gear 84 is attached to the shaft of the drive motor 86 and engages the teeth 82 to rotate the lead screw. A nut 88 is threadably engaged with threads 90 of the lead screw 76. The nut 88 is prevented from rotating with the lead screw (a yoke 92 of the nut 88 engages a guide dowel 94 to allow sliding and prevent rotation of the nut) so that rotation of the lead screw causes axial movement of the nut. A fork 96 having ears 98, 100 is slidably mounted on the lead screw. The ears are positioned at each side of the nut and compression springs 102, 104 are mounted between the nut and each of the ears 98, 100.

In operation, the motor 86 receives an electrical signal that induces rotation of worm wheel 80 which rotates lead screw 76 and forces left or right movement of the nut 88. The corresponding spring 102, 104 is urged against the corresponding ear 98, 100 to shift fork 96 to any of the three positions previously described, i.e., toward the left to produce frictional engagement of the control plate with the driven member 32 or to the right to force engagement of the disk 60 with brake drum 64; or to a mid-position out of engagement with either.

Figure 4:
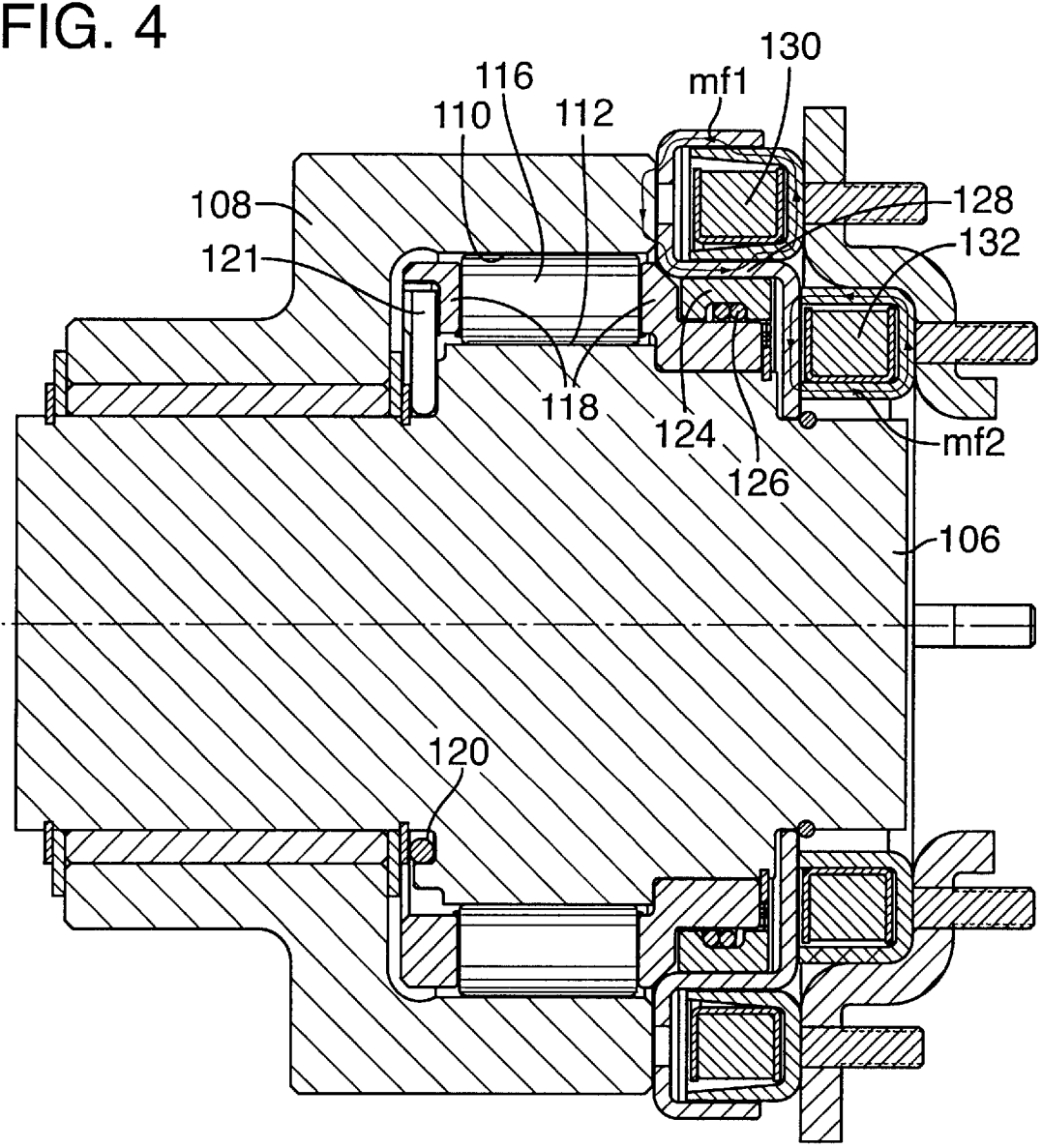
FIGS. 4 and 5 are a sectional assembled view and an exploded isometric view respectively of a second embodiment of the invention.
Figure 5:
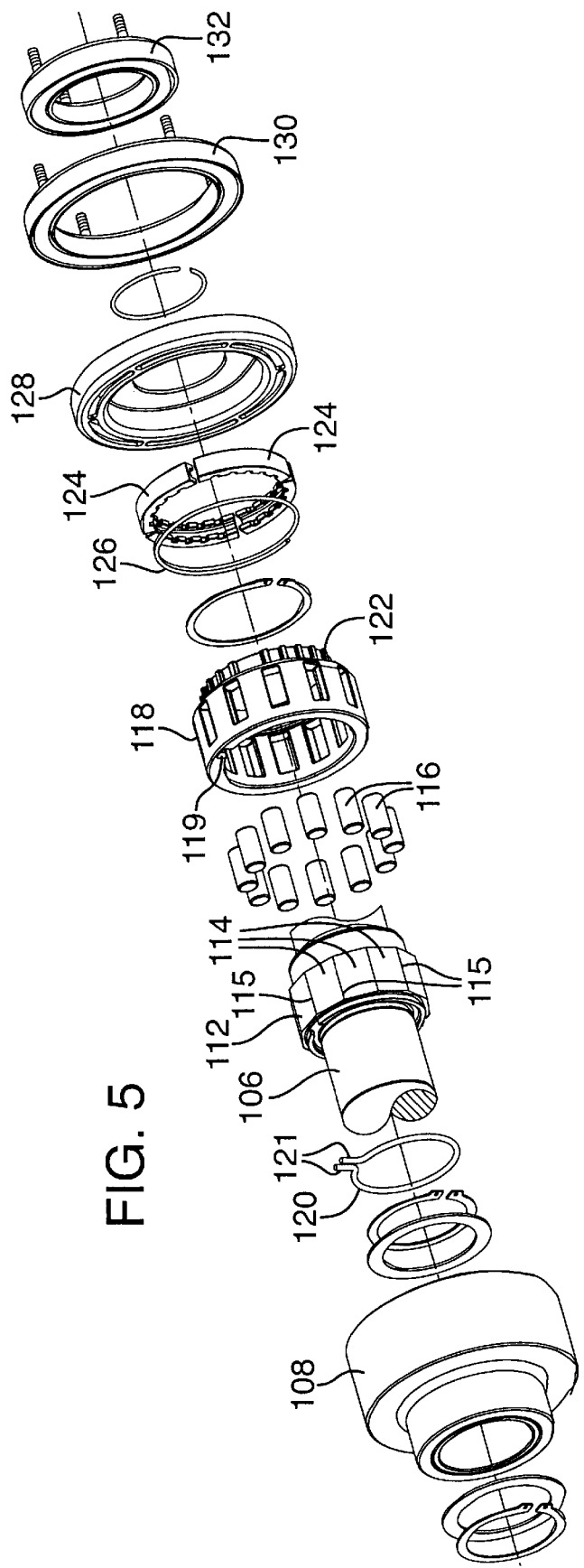

FIGS. 4 and 5 illustrate a second embodiment of the invention. Item 106 is the drive member and item 108 is the driven member. The inner surface 110 of the driven member 108 is a cylindrical surface which surrounds the periphery 112 of the drive member 106. The periphery 112 is a polygon including numerous flat surfaces 114 which intersect to form corners 115. Interposed between the surface 110 and periphery 112 are rollers 116. The rollers 116 are contained within a cage 118 (which corresponds to the control plate of the first embodiment.) The rollers are sized to be greater than the radial distance between the surface 110 and the periphery 112 (at the center of the flat surfaces 114) and greater than the smallest radial distance between the surface and the periphery (at the corners or junctures of the flat surfaces). Thus, the cage and rollers have limited rotation relative to the drive member (they are trapped between the corners). At a center position on the flat surfaces, the rollers permit free rotation of the driven member relative to the drive member. As the rollers move toward the corners in either direction, they become wedged between the drive and driven members and interlock the drive and driven members. (See U.S. Pat. No. 5,195,604 for a more detailed explanation of the roller clutch operation.)

A centering spring 120 is rotatively secured to the drive member 106 and is engaged by the roller cage 118 (nibs 121 fit notch 119). The nibs can be biased apart for resisted relative movement and urge the cage to a center position relative to the drive member 106, i.e., with the rollers 116 centered on the flat surfaces 114.

The roller cage 118 includes a splined hub portion 122 on which brake shoes 124 are engaged. An expansion spring 126 urges the shoes 124 radially outwardly against a shaped armature 128. The armature is shaped to have an upper cup shape and a lower stem as seen in the upper half of FIG. 4. Positioned in close adjacency within the cup portion is a first fixed electromagnetic coil 130 and positioned in close adjacency to the stem portion of the armature 128 is a second fixed electromagnetic coil 132. The brake shoes 124 are urged radially outwardly against the bottom leg 134 of the cup shaped portion of the armature by spring 126.

As illustrated by directional arrows, a magnetic force mf1 is generated when electromagnet 130 is activated and magnetic force mf2 is generated when electromagnet 132 is actuated.

In operation, with both electromagnets de-activated, the armature 128 is allowed to rotate freely. The centering spring 120, 121 urges the cage to its centered position (the rollers centered on flat surfaces 114) and there is no engagement between the drive and driven members. This is the two-wheel drive mode.

By activation only of electromagnet 130, the magnetic field mf1 produces a magnetic attraction as between the armature 128 and the driven member 108. Regardless of the relative rotation as between the drive and driven members (106, 108) the roller cage and thus the rollers are urged toward either of the rearward or forward corners 115 and the drive and driven members become locked, i.e., the drive and driven members are forced to rotate substantially in unison. This is the locked four-wheel drive position.

By activation only of electromagnet 132, the magnetic field mf2 produces a magnetic attraction between the armature 128 and the electromagnetic coil 132 which is grounded. The armature thus resists rotation to urge retardation of the roller cage (via the brake shoes 124) which accordingly urges the rollers to a trailing position. Anytime the drive member tries to overrun the driven member, the rollers lock up and the drive member and driven member rotate together. When the driven member attempts to overrun the drive member, the rollers are urged to a center position and the driven member is free to rotate faster than the drive member. This is the automatic four-wheel drive mode.

Figure 6:
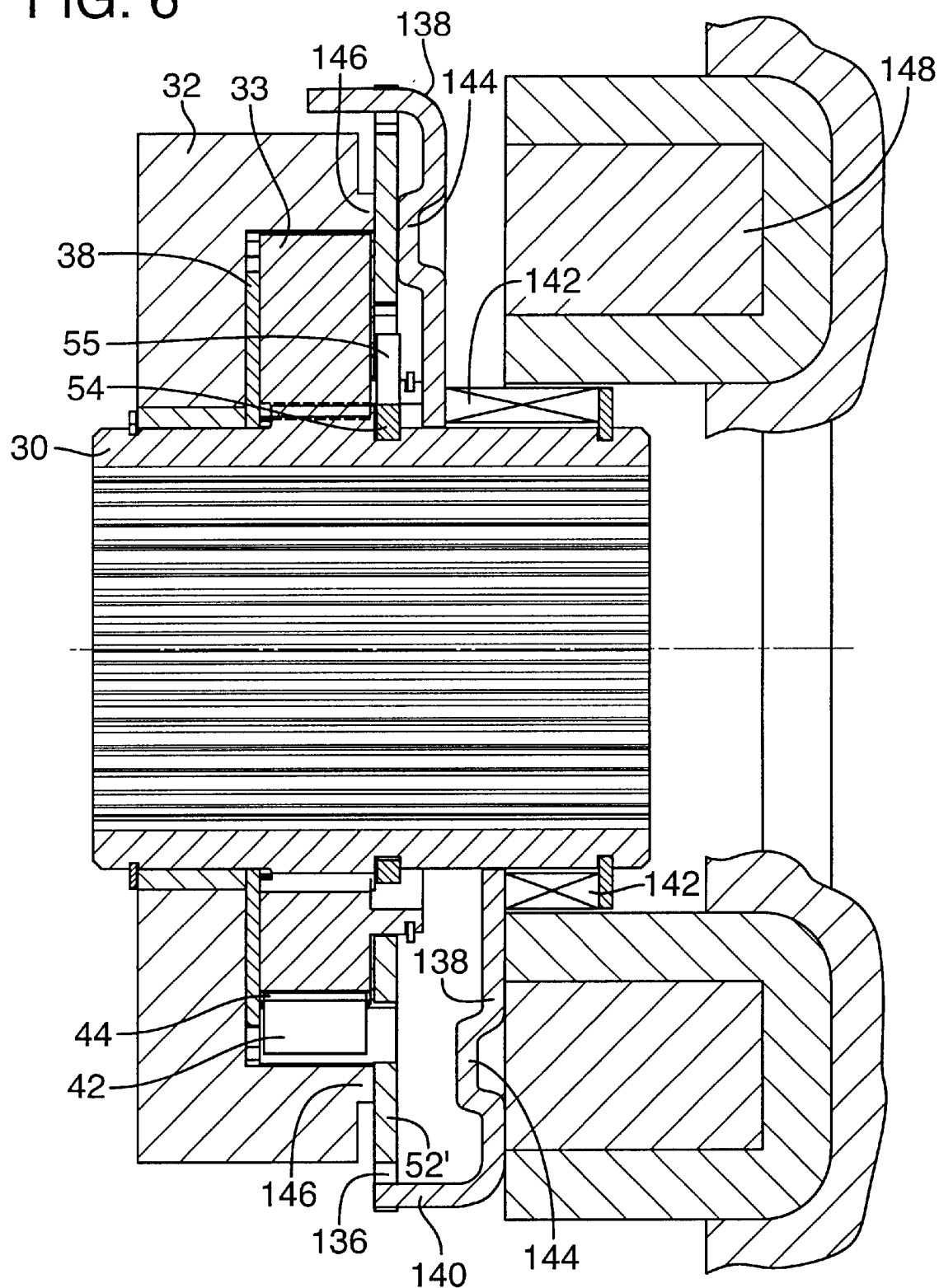
FIGS. 6 and 7 are sectional assembled view and an exploded isometric view respectively of a third embodiment of the invention.
Figure 7:
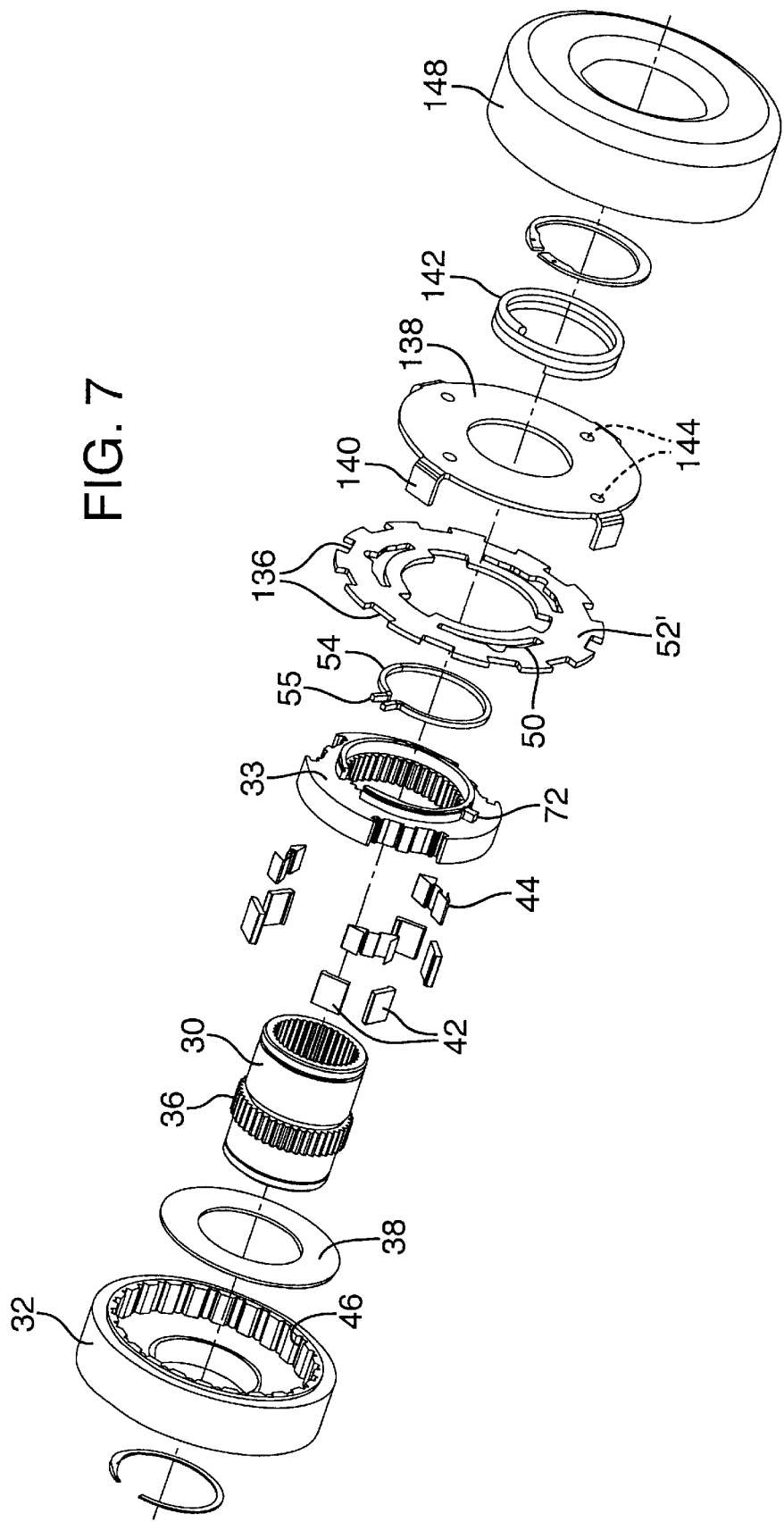

A third embodiment is illustrated in FIGS. 6 and 7. This embodiment is similar to the first embodiment with respect to the manner of engagement and many of the components are similar both in appearance and operation. Accordingly, similar reference numbers will be used and the reader is referred to the explanation and description of the first embodiment.

The control plate of this third embodiment is somewhat different and is identified by reference 52'. The cam slots which function to control the projection of the pawls 42 are similar to that of the first embodiment and are identified as item 50. Notches 136 are provided on the periphery of the control plate 52'. A disk shaped armature 138 is mounted adjacent control plate 52'and axially directed tabs 140 from the armature 138 are engaged with the notches 136 of the control plate. The armature can move axially (as can control plate 52' to a limited extent) and can also move axially relative to the control plate as will be noted from the split illustration of FIG. 6. The armature and the control plate nevertheless remain rotatively locked together.

A two-stage (or dual spring arrangement) 142 urges movement of the armature 138 toward the control plate 52'. Bosses 144 are provided on the armature 138 (but could be on the control plate) that abuts the control plate and urges the control plate into abutment with rim 146 of the driven member 32. This places the control plate in frictional engagement with the driven member and produces the locked four-wheel drive mode.

An electromagnet 148 is a two-stage magnet that has both a strong and weak magnetic attractions. In the strong attraction setting, the electromagnet draws the armature with sufficient force to overcome the spring 142 and into engagement with the magnet as seen in the bottom half of FIG. 6. The magnet is fixed and thus the armature and control plate are urged to ground. This produces the automatic four-wheel drive mode.

With the electromagnet 148 set at the low setting', the magnetic force is sufficient to overcome the weaker components of the two-stage spring to withdraw the armature away from the control plate to separate from the drive member. That magnetic force will not overcome the stronger spring action which prevents the armature from engaging the magnet. The centering spring 54 centers the control plate and the vehicle is placed in two-wheel drive.

Actuation of the Different Driving Modes

FIG. 8 schematically illustrates the manner by which the different driving modes are selected. First, it will be appreciated that each of the embodiments enable selection as between two-wheel, locked four-wheel and automatic four-wheel drive modes via electronic signals. Providing an electronic signal, e.g., from the vehicle's battery or alternator, is well known as are switches that select among different electrical paths. A manual select switch can be made available to a driver of the vehicle and he need only position the switch as between the three selections to obtain the desired drive mode.

This same selection process can be produced automatically and the combination as between manual and automatic control of the selection can vary. For example, the setting may be made to permit only manual operation or only automatic operation or even manual operation which can be ovc operation. In any position of abutment with the control plate to thereby allow the event, automatic operation is at least an option.

Automatic operation is enabled at least in part by the existing sensors and computer capability of the vehicle. All modern vehicles contemplated herein are equipped with the capability and do monitor innumerable working components of the vehicle, e.g., engine speed and acceleration, brake application, speed and acceleration/deceleration of each wheel, etc. This capability is represented in FIG. 8 by the block 150 labeled ECU. An analyzer component 151 is designed to monitor input from selected sensors and to make comparisons. For example, it will compare the velocity and acceleration of the front wheels vs. the rear wheels. It will note the application of the brakes and the rate of braking, also comparing this information as between the rear and front wheels. Based on engine power load at vehicle speeds, there may be a determination whether the vehicle is going uphill or downhill, whether the vehicle is turning, going forward or in reverse. Any and all of these factors may be scrutinized and result in the determination that under the conditions then existing, one or the other of two-wheel drive, locked four-wheel drive or automatic four-wheel drive is desirable. As indicated by lines 152*a*, 152*b* and 152*c*, one of the drive modes is engaged as a result of this analysis.

The invention is considered to have wide spread application for vehicles and there are numerous possible and/or probable variations that can be made without departing from the intended scope of the invention. Accordingly, the invention is to be determined based on the definition of the claims appended hereto and it is to be noted that unless the term "means for" is used in the claims, it is intended that the claims are not to be interpreted by ¶ of 35 USC §112.

The invention claimed is:

1. A vehicle having drive clutch control comprising:
   a clutch control arrangement positioned in a vehicle's drive line for controlling a pair of wheels selected from a front pair and a rear pair of wheels;
   a drive member, a driven member and an engaging mechanism in said clutch control arrangement;
   an engaging mechanism mounted for selectively engaging the drive member and the driven member and said engaging mechanism convertible between a first driving mode where the engaging mechanism does not produce engagement, a second driving mode where the engaging mechanism produces engagement only when the drive member overruns the driven member, and a third driving mode where the engaging mechanism produces engagement when either the drive or driven member overruns the other;
   an electrically powered actuator connected to said engaging mechanism, a vehicle sensing system that collects data from the vehicle's working components including wheel speed of the vehicle's wheels, and an analyzer connected to said vehicle's sensing system and receiving said data for determining a desired driving mode and for transmitting an electrical signal indicating the desired driving mode, and said actuator connected to said analyzer and responsive to said electrical signal for initiating the desired mode of engagement;
   said including pawls projectable from the drive member to the driven member in either direction of relative rotation, a control plate operable to control the projection of the pawls, and a coupler between the actuator and the control plate, said coupler responsive to said actuator for selective coupling of the control plate with the driven member to produce locked four-wheel drive, coupling of the control plate to ground to produce automatic four-wheel drive, and non-coupling of the control plate with either to produce two-wheel drive.

2. A vehicle having drive clutch control comprising:
   a clutch control arrangement positioned in a vehicle's drive line for controlling a pair of wheels selected from a front pair and a rear pair of wheels;
   a drive member and a driven member in said clutch control arrangement;
   an engaging member mounted for selectively engaging the drive member and the driven member and said engaging member convertible between a first driving mode where the engaging member does not produce engagement, a second driving mode where the engaging member produces engagement only when the drive member overruns the driven member, and a third driving mode where the engaging member produces engagement when either the drive or driven member overruns the other;
   an electrically powered actuator connected to said engaging mechanism, a vehicle sensing system that collects data from the vehicle's working components including wheel speed of the vehicle's wheels, and an analyzer connected to said vehicle's sensing system and receiving said data for determining a desired driving mode and for transmitting an electrical signal indicating the desired driving mode;
   said actuator connected to said analyzer and responsive to said electrical signal for initiating the desired mode of engagement, said actuator comprising first and second electromagnets and an armature associated with said electromagnets, said armature coupled to the engaging mechanism;
   said first electromagnet when energized producing attraction between the armature and the driven member to produce locked four-wheel drive as the third driving mode, said second magnet when energized producing attraction between the armature and ground to produce automatic four-wheel drive as the second driving mode, and the first and second electromagnets not energized to produce two-wheel drive as the first driving mode.

3. A vehicle having drive clutch control comprising:
   a clutch control arrangement positioned in a vehicle's drive line for controlling a pair of wheels selected from a front pair and a rear pair of wheels;
   a drive member and a driven member in said clutch control arrangement;
   an engaging mechanism mounted for selectively engaging the drive member and the driven member and said engaging mechanism convertible between a first driving mode where the engaging mechanism does not produce engagement, a second driving mode where the engaging mechanism produces engagement only when the drive member overruns the driven member, and a third driving mode where the engaging mechanism produces engagement when either the drive or driven member overruns the other;
   an electrically powered actuator connected to said engaging mechanism, a vehicle sensing system that collects data from the vehicle's working components including wheel speed of the vehicle's wheels, and an analyzer connected to said vehicle's sensing system and receiving said data for determining a desired driving mode and for transmitting an electrical signal indicating the desired driving mode;

said actuator connected to said analyzer and responsive to said electrical signal for initiating the desired mode of engagement; said actuator comprising a two-stage electromagnet having first and second levels of magnetic attraction and a two-stage spring member having first and second levels of spring bias, and an armature coupled to said engaging mechanism and responsive to the magnetic attraction and the spring bias to produce the three driving modes as a result of no magnetic attraction and first and then second levels of magnetic attraction.

4. A vehicle drive line comprising:

a drive member, a driven member and a clutch assembly operable to provide clutch engagement of the drive and driven members when the drive member attempts overrunning the driven member in either direction of rotation;

a control member in rotative engagement with the drive member and rotatably shiftable relative to the drive member between leading and trailing positions determined by the direction of rotation of the drive member, said control member permitting clutch engagement in the trailing position and preventing clutch engagement in the leading position;

a rotatively mounted brake drum engageable with said control member and a non-rotatable radially biased brake assembly in frictional engagement with said brake drum, said brake drum as engaged with said control member urging retardation of the control member and thereby shifting of the control member to its trailing position in either direction of rotation of the drive member.

5. A vehicle drive line as defined in claim 4 wherein said brake assembly includes brake shoes biased against the brake drum for resistive and permitted rotation of the brake drum.

6. A vehicle drive line comprising:

a drive member, a driven member and a clutch assembly operable to provide clutch engagement of the drive and driven members when the drive member attempts overrunning the driven member in either direction of rotation;

a control member in rotative engagement with the drive member and rotatively shiftable relative to the drive member between leading and trailing positions determined by the direction of rotation of the drive member, said control member permitting clutch engagement in the trailing position and preventing clutch engagement in the leading position;

said control member including a rotatable brake drum portion and a non-rotatable radially biased brake assembly in frictional engagement with said brake drum portion to urge retardation of the control member and thereby shifting of the control member to it's trailing position in either direction of rotation of the drive member.

7. A vehicle drive line as defined in claim 8 wherein said brake assembly includes brake shoes biased against the brake drum for resistive and permitted rotation of the brake drum.

8. A vehicle comprising:

a drive line including a rotatable drive member and a rotatable driven member in adjacent relation and independently rotatable, said drive and driven members subjected to conditions where either may be induced to rotate faster than the other;

an engagement mechanism positioned between said drive and driven members and movable between positions of engaging and not engaging said drive and driven members;

a rotating control member controlling the engagement mechanism and coupled to the drive member with limited rotative movement between leading and trailing positions relative to the rotating drive member, and in the trailing position providing engagement of the drive and-driven members when the drive member is induced to rotate faster than the driven member, and in the leading position providing engagement of the drive and driven members when the driven member is induced to rotate faster than the drive member;

said control member selectively biased to ground whereby the control member is maintained in the trailing position for engagement between drive and driven members only when the drive member rotates faster than the driven member, and alternatively said control member biased to the driven member whereby the control member is moved with the driven member between the trailing and leading positions for engagement between the drive and driven members when either the drive member or the driven member rotates faster than the other; and an actuator connected to the control member and selectively urging said control member into biasing relation to ground or to said driven member.

9. A vehicle as defined in claim 8 wherein the control member when positioned intermediate its leading and trailing positions prevents engagement of the engagement mechanism and thereby provides independent rotation of the drive and driven members, said actuator selectively and alternatively urging said control member to said intermediate position.

10. A vehicle as defined in claim 9 wherein the drive member, driven member and engaging mechanism are cooperatively configured to provide a roller clutch engagement including rollers as the engagement mechanism and a roller cage as the rotating control member controlling the positioning of the rollers between mated surfaces of the drive and driven members, a coupler between the actuator and the roller cage, said coupler responsive to said actuator for selective coupling of the roller cage to the driven member and alternatively for selective coupling of the roller cage to ground and alternatively for selective non-coupling of the roller cage to either the driven member or ground, and thereby producing selectively the driving modes of locked four-wheel drive, automatic four-wheel drive and two-wheel drive, respectively.

11. A vehicle as defined in claim 9 wherein a vehicle sensing system collects data from the vehicle's working components including wheel speed of the vehicle wheels, and an analyzer connected to said vehicle sensing system and receiving said data for determining a desired driving mode as between the three positions of the control member, and said actuator connected to said analyzer and responsive to said analyzer for initiating the desired mode of engagement.

12. A vehicle as defined in claim 9 including a manual switch connected to the actuator and accessible to an operator of the vehicle, said switch manually selectively providing electrical signals to initiate a desired mode of driving as between the three positions of the control member.

13. A vehicle as defined in claim 8 wherein a coupler connects the actuator to the control member, said coupler including a spring biasing member that produces increased spring pressure on the control member when movement is resisted by interlock of the engagement mechanism.

* * * * *